US012352727B2

(12) United States Patent
Lepage

(10) Patent No.: US 12,352,727 B2
(45) Date of Patent: Jul. 8, 2025

(54) ACOUSTIC IMAGING TECHNIQUES USING MACHINE LEARNING

(71) Applicant: Evident Canada, Inc., Québec (CA)

(72) Inventor: Benoit Lepage, L'Ancienne-Lorette (CA)

(73) Assignee: Evident Canada, Inc., Québec (CA)

( * ) Notice: Subject to any disclaimer, the term of this patent is extended or adjusted under 35 U.S.C. 154(b) by 341 days.

(21) Appl. No.: 18/041,630

(22) PCT Filed: Aug. 4, 2021

(86) PCT No.: PCT/CA2021/051083
§ 371 (c)(1),
(2) Date: Feb. 14, 2023

(87) PCT Pub. No.: WO2022/032378
PCT Pub. Date: Feb. 17, 2022

(65) Prior Publication Data
US 2023/0304968 A1 Sep. 28, 2023

Related U.S. Application Data

(60) Provisional application No. 63/065,850, filed on Aug. 14, 2020.

(51) Int. Cl.
*G01N 29/06* (2006.01)
*G01N 29/14* (2006.01)
(Continued)

(52) U.S. Cl.
CPC .......... *G01N 29/069* (2013.01); *G01N 29/14* (2013.01); *G01N 29/262* (2013.01); *G01N 29/4481* (2013.01); *G01N 2291/106* (2013.01)

(58) Field of Classification Search
None
See application file for complete search history.

(56) References Cited

U.S. PATENT DOCUMENTS

| 10,123,707 B2 * | 11/2018 | Oraevsky | A61B 5/015 |
| 2004/0073113 A1 * | 4/2004 | Salgo | A61B 8/00 |
| | | | 600/438 |

(Continued)

FOREIGN PATENT DOCUMENTS

| WO | WO-2006113445 A1 | 10/2006 |
| WO | WO-2015089667 A1 | 6/2015 |
| WO | WO-2022032378 A1 | 2/2022 |

OTHER PUBLICATIONS

"International Application Serial No. PCT/CA2021/051083, International Search Report mailed Nov. 1, 2021", 3 pgs.

(Continued)

*Primary Examiner* — Suman K Nath
(74) *Attorney, Agent, or Firm* — Schwegman Lundberg & Woessner, P.A.

(57) ABSTRACT

A computerized method of image processing using processing circuitry to apply a previously trained machine learning model in a system for non-destructive testing (NDT) of a material is described. The method can include acquiring acoustic imaging data of the material, the acoustic imaging data acquired at least in part using an acoustic imaging modality, generating an acoustic imaging data set corresponding to an acoustic propagation mode, applying the previously trained machine learning model to the acoustic imaging data set, and generating an image of the material depicting a probability of a flaw per pixel or voxel based on the application of the previously trained machine learning model.

16 Claims, 8 Drawing Sheets

(51) Int. Cl.
*G01N 29/26* (2006.01)
*G01N 29/44* (2006.01)

(56) References Cited

U.S. PATENT DOCUMENTS

2020/0069275 A1  3/2020  Stavros
2020/0151513 A1  5/2020  Lee

OTHER PUBLICATIONS

"International Application Serial No. PCT/CA2021/051083, Written Opinion mailed Nov. 1, 2021", 4 pgs.

\* cited by examiner

US 12,352,727 B2

ACOUSTIC IMAGING TECHNIQUES USING MACHINE LEARNING

CLAIM OF PRIORITY

This application is a U.S. National Stage Filing under 35 U.S.C. 371 from International Application No. PCT/CA2021/051083, filed on Aug. 4, 2021 and published as WO 2022/032378 on Feb. 17, 2022, which claims the benefit of priority of U.S. Provisional Patent Application Ser. No. 63/065,850, filed on Aug. 14, 2020, the entire contents of which being incorporated herein by reference.

FIELD OF THE DISCLOSURE

This document pertains generally, but not by way of limitation, to non-destructive evaluation using acoustic techniques.

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures.

Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

SUMMARY OF THE DISCLOSURE

The present inventor has recognized that there is a significant amount of information in the S-matrix that is lost through the summation process in total focusing method (TFM) and other delay-and-sum algorithms for acoustic techniques. The present inventor has recognized the desirability of applying the delayed signals to a trained machine learning model, rather than use summation, such as a TFM summation. By using a trained machine learning model and avoiding summation, information can be retained and used by the trained machine learning model to generate a probability of a flaw per pixel or voxel based on the application of the trained machine learning model. In some examples, an image of the material depicting the probability of the flaw per pixel or voxel can be generated, also referred to in this disclosure as a "flaw characterization image".

In some aspects, this disclosure is directed to a computerized method of image processing using processing circuitry to apply a previously trained machine learning model in a system for non-destructive testing (NDT) of a material, the method comprising: acquiring acoustic imaging data of the material, the acoustic imaging data acquired at least in part using an acoustic imaging modality; generating an acoustic imaging data set corresponding to an acoustic propagation mode; applying the previously trained machine learning model to the acoustic imaging data set; and generating an image of the material depicting a probability of a flaw per pixel or voxel based on the application of the previously trained machine learning model.

In some aspects, this disclosure is directed to a computerized method of training processing circuitry using machine learning in a system for non-destructive testing (NDT) of a material, the method comprising: training a machine learning model to be used to generate an image of the material from an acoustic imaging data set corresponding to an acoustic propagation mode, the acoustic imaging data set acquired at least in part using an acoustic imaging modality.

In some aspects, this disclosure is directed to a computerized method of image processing using processing circuitry to apply a previously trained machine learning model in a system for non-destructive testing (NDT) of a material, the method comprising: acquiring acoustic imaging data of the material, the acoustic imaging data acquired at least in part using an acoustic imaging modality; generating an acoustic imaging data set corresponding to an acoustic propagation mode; applying the previously trained machine learning model to the acoustic imaging data set; and generating a probability of a flaw per pixel or voxel based on the application of the previously trained machine learning model.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
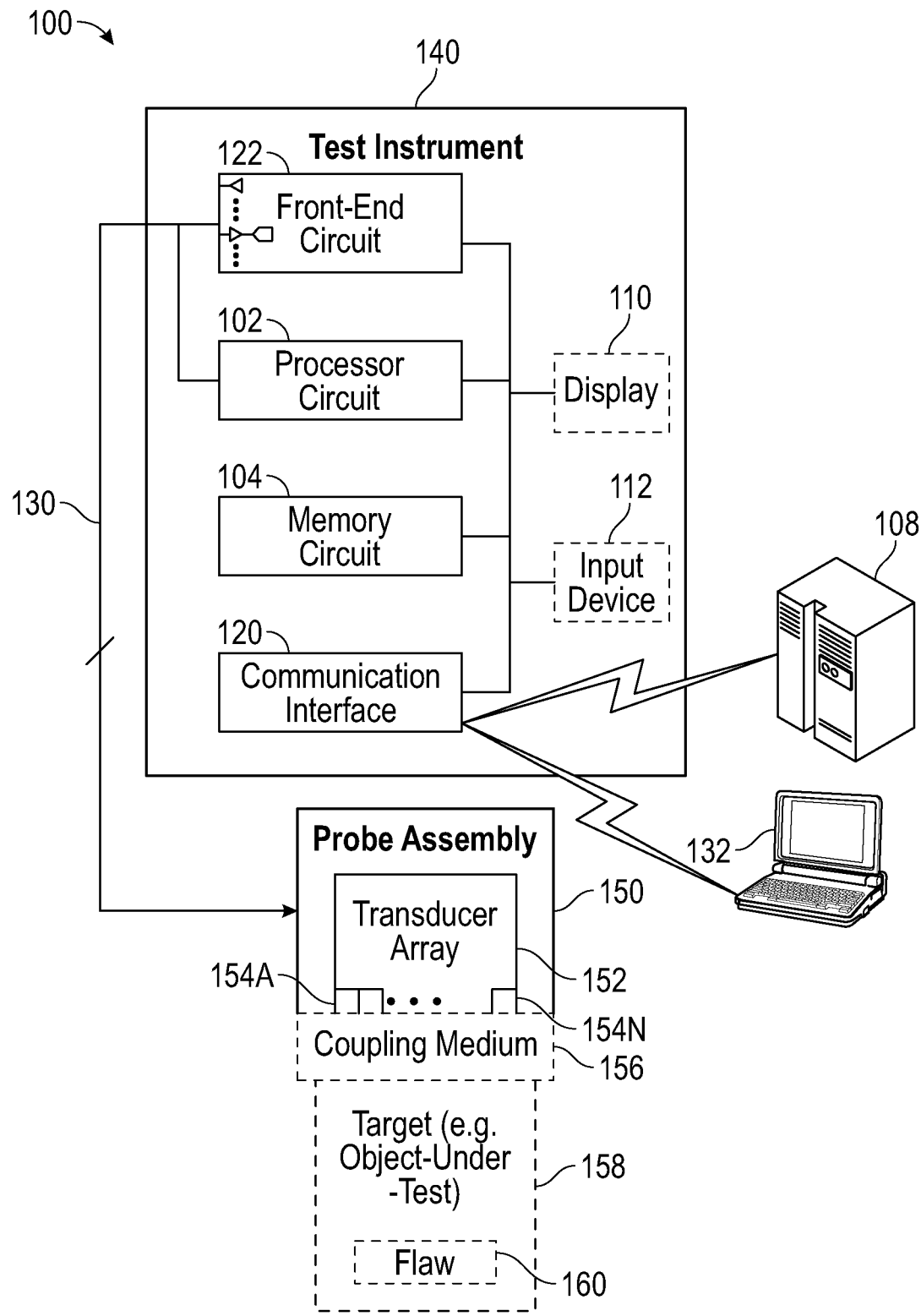
FIG. 1 illustrates generally an example comprising an acoustic inspection system 100, such as can be used to perform one or more techniques described herein.

As mentioned above, acoustic techniques can be used to perform non-destructive testing (sometimes referred to generally as non-destructive evaluation) of structures by coupling acoustic energy onto or within such structures and detecting scattered or reflected energy corresponding to features on or within such structures under test.

The hallmark of ultrasonic phased array is the capacity to focus and steer an acoustic beam at a desired position in an inspected part. The phased array focusing approach uses delays, applied on both the transmission and reception elements of the phased array probe, to synchronize the time of flights of short, pulsed waveforms at the position of interest. At the focal zone in the specimen, the width of the generated acoustic beam narrows, and the corresponding detection resolution increases.

Conventional phased array uses the physical superposition of elementary acoustic waves in transmission to produce an acoustic beam aimed at a specific focused depth in the inspected piece. The set of transmitter elements form an aperture from which a coherent acoustic pulse emerges. The action of conventional phased array transmission is referred to as beamforming. In an S-scan, for instance, beamforming acquisition occurs for each user-specified angle.

In one approach, a plurality of acoustic transducers can be used to perform such acoustic inspection. Such a plurality of transducers can be referred to as an "array," but such an array need not be planar or linear in arrangement or orientation, and need not have a constant pitch between respective transducer elements.

Processing of received acoustic echo signals to form images can involve various techniques. In one approach, respective received acoustic echo signals can be "delayed and summed" to provide focusing within a specific locus on or within the structure under test.

In another approach, a technique called a "total focusing method" (TFM) can be used, such as involving a full-matrix capture (FMC) acquisition scheme where focus can be achieved across a broad spatial region on or within a structure under test. TFM also uses a delay-and-sum algorithm. Several TFM propagation modes are available, where the TFM propagation modes represent the path of ultrasound waves from the transmitter to an image pixel in a TFM zone and back to the receiver (including reflections).

The TFM propagation modes are defined by the types of waves (transverse or longitudinal) for each leg of the path. A pulse-echo mode is any propagation mode where the transmitted beam and the reception beam follow the exact same path in the inspected piece. Pulse-echo modes can be achieved in a direct path with no skips, such as TT, or with multiple skips, e.g., TT-TT. In a self-tandem mode, e.g., TT-T, the transmission and reception propagation paths do not match exactly, but the transmitting and receiving elements are on the same phased array probe. Pulse-echo and self-tandem propagation modes are not specific to the TFM; they can be obtained in a conventional phased array as well as the TFM.

To produce a pixel or voxel in an image using TFM, for example, a processor can calculate the delays associated with that pixel or voxel. The processor can determine the amplitude at the particular delay, generate a scattering matrix (hereafter "S-matrix"), and then generate an image of the material being inspected. The S-matrix, once summed by TFM, can be used by the processor to produce a pixel or voxel.

The present inventor has recognized that there is a significant amount of information in the S-matrix that is lost through the summation process in TFM and other delay-and-sum algorithms for acoustic techniques. In accordance with various techniques of this disclosure, the present inventor has recognized the desirability of applying the delayed signals to a trained machine learning model, rather than use summation, such as a TFM summation. By using a trained machine learning model and avoiding summation, information can be retained and used by the trained machine learning model to generate a probability of a flaw per pixel or voxel based on the application of the trained machine learning model, as described in detail below. In some examples, an image of the material depicting the probability of the flaw per pixel or voxel can be generated, also referred to in this disclosure as a "flaw characterization image".

FIG. 1 illustrates generally an example comprising an acoustic inspection system 100, such as can be used to perform one or more techniques described herein. The acoustic inspection system 100 of FIG. 1 is an example of an acoustic imaging modality, such as an acoustic phased array system, that can implement various techniques of this disclosure.

The inspection system 100 can include a test instrument 140, such as a hand-held or portable assembly. The test instrument 140 can be electrically coupled to a probe assembly, such as using a multi-conductor interconnect 130. The probe assembly 150 can include one or more electroacoustic transducers, such as a transducer array 152 including respective transducers 154A through 154N. The transducers array can follow a linear or curved contour, or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various different probe assemblies 150. Generally, the transducer array 152 includes piezoelectric transducers, such as can be acoustically coupled to a target 158 (e.g., an object under test) through a coupling medium 156. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement, and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of imaging data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic imaging data, such as FMC data or virtual source aperture (VSA) data, of a material using an acoustic imaging modality, such as an acoustic phased array system. The processor circuit 102 can then generate an acoustic imaging data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

As described in more detail below, the processor circuit 102 or another processor circuit can apply a previously trained machine learning model to the acoustic imaging data set, such as a scattering matrix (S-matrix), plane wave matrix, or other matrix or data set, and generating an image of the material depicting a probability of a flaw per pixel or voxel based on the application of the previously trained machine learning model (a "flaw characterization image").

Figure 2:
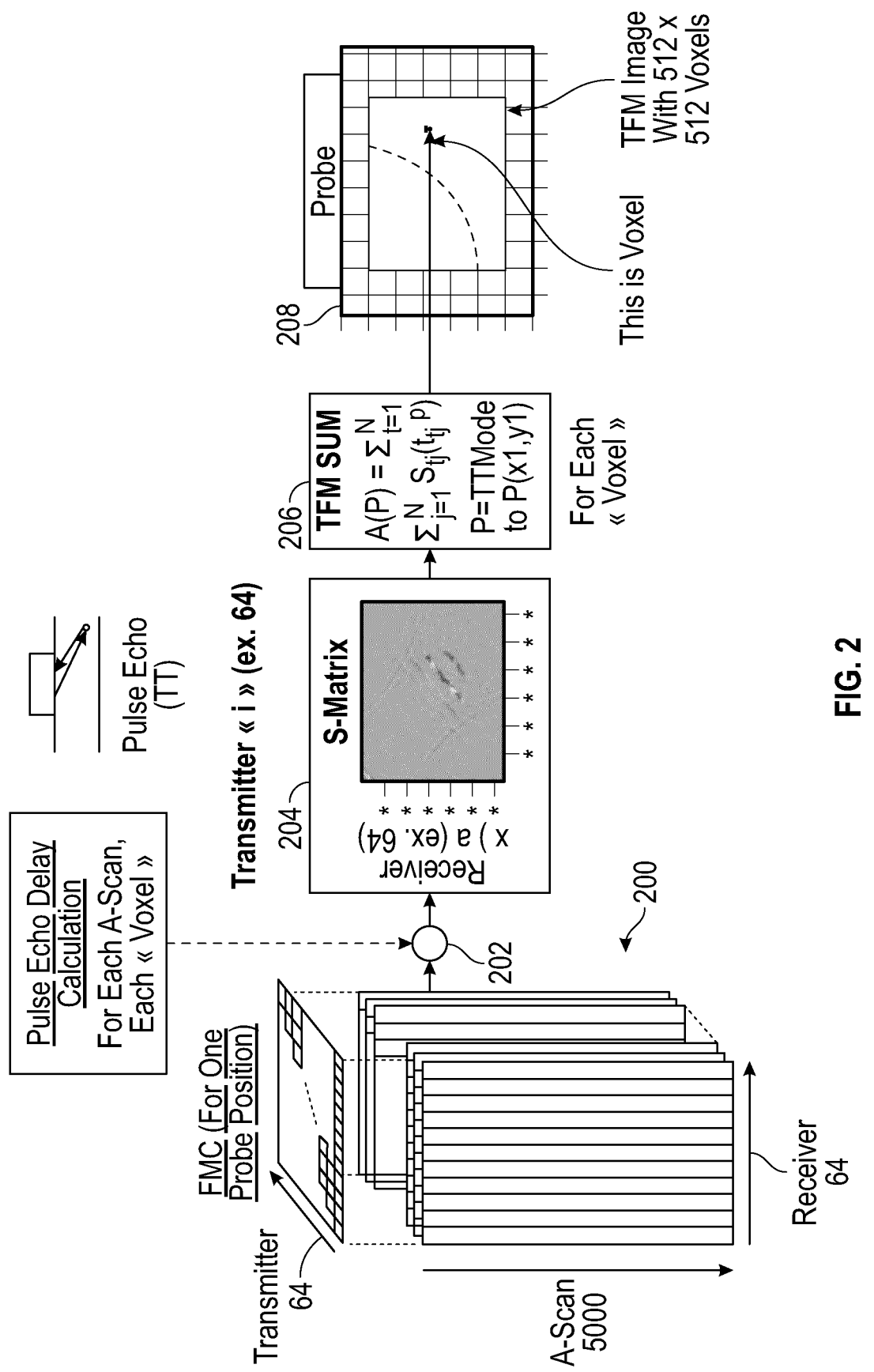
FIG. 2 is a conceptual diagram illustrating a non-limiting example of total focusing method.

FIG. 2 is a conceptual diagram illustrating a non-limiting example of total focusing method. Starting on the left-hand side, an acoustic inspection system, such as the acoustic inspection system 100 of FIG. 1, can include 64 elements, where all elements transmit and then receive, which generates a matrix of A-scans that constitute the FMC data 200. In this non-limiting example, a pulse echo direct (TT) propagation mode 202 was used. In other examples, self-tandem (TT-T), pulse echo with skip (TT-TT), or other propagation modes can be used.

A processor circuit, such as the processor circuit 102 of FIG. 1, can calculate a pulse echo delay for each A-scan and for each pixel or voxel. The processor circuit can generate an S-matrix data set 204 that includes amplitude information and the corresponding delay data (or phase data) for each pixel or voxel. The processor circuit can perform a TFM summation 206 on the S-matrix data set to generate a single pixel or voxel in an image 208 of the material.

Figure 3:
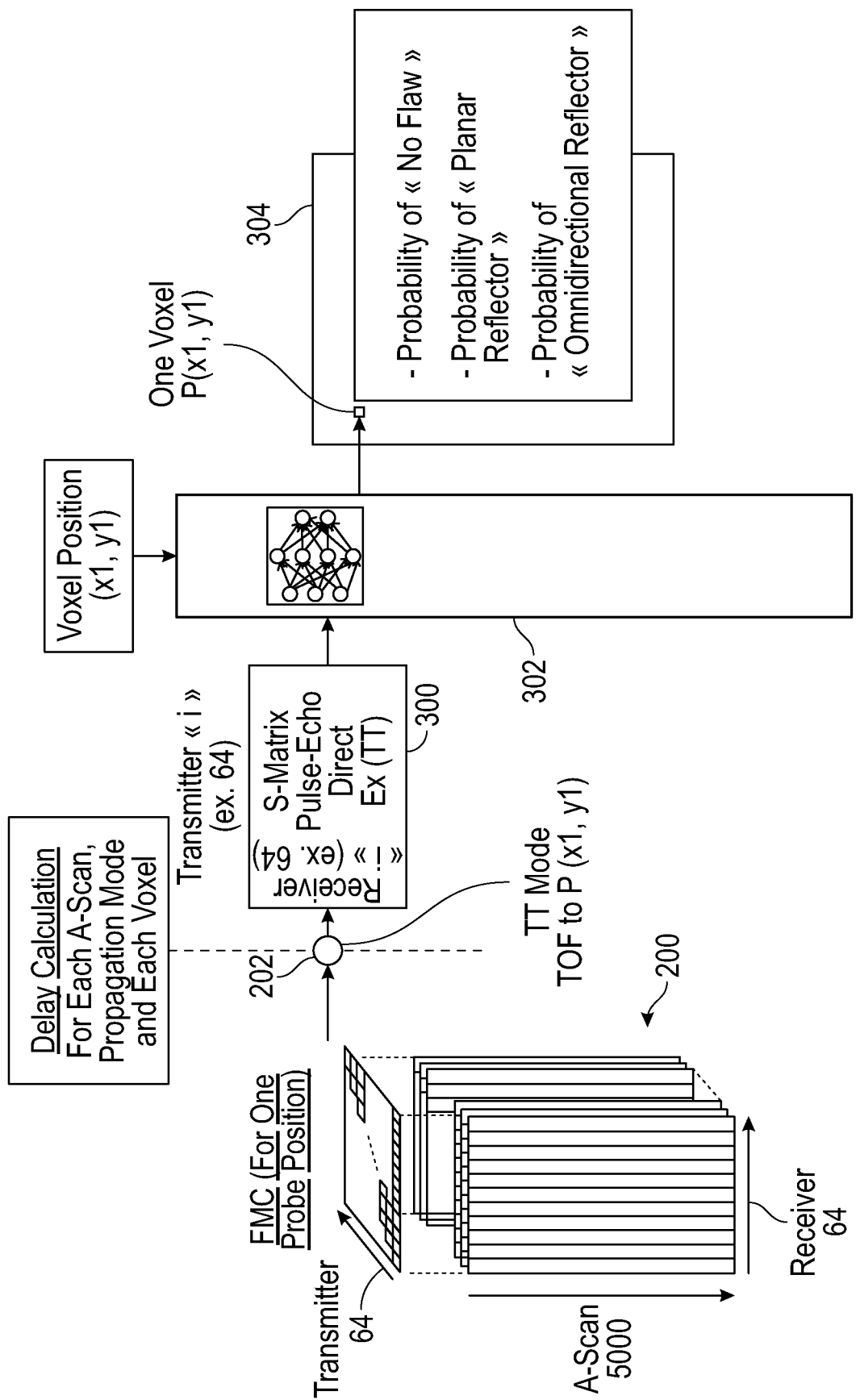
FIG. 3 is a conceptual diagram illustrating a non-limiting example of a computerized method of image processing using processing circuitry to apply a previously trained machine learning model in a system for non-destructive testing (NDT) of a material.

FIG. 3 is a conceptual diagram illustrating a non-limiting example of a computerized method of image processing using processing circuitry to apply a previously trained machine learning model in a system for non-destructive testing (NDT) of a material. Starting on the left-hand side, an acoustic inspection system, such as the acoustic inspection system 100 of FIG. 1, can acquire acoustic imaging data of the material, such as FMC, which is acquired at least in part using an acoustic imaging modality, such as TFM. The acoustic inspection system can include 64 elements, where all elements transmit and then receive, which generates a matrix of A-scans that constitute the FMC data 200. In this non-limiting example, a pulse echo direct (TT) propagation mode 202 was used. In other examples, self-tandem (TT-T), pulse echo with skip (TT-TT), or other propagation modes can be used.

A processor circuit, such as the processor circuit 102 of FIG. 1, can calculate a pulse echo delay for each A-scan and for each pixel or voxel. The processor circuit can generate an acoustic imaging data set, such as an S-matrix, corresponding to an acoustic propagation mode. For example, the processor circuit can generate an S-matrix 300 that includes amplitude information and the corresponding delay data (or phase data) for each pixel or voxel. As described in more detail below, in some examples, the S-matrix can include phase data only and no amplitude information.

Instead of performing a TFM summation on the S-matrix data set to generate a single pixel or voxel in an image of the material, as in FIG. 2, the processor circuit 102 or another processor circuit can apply a previously trained machine learning model 302 to the acoustic imaging data set, such as to the S-matrix data set or other acoustic imaging data set, such as a plane wave matrix or other matrix or data set.

The previously trained machine learning model 302 can generate a probability of a flaw per pixel or voxel in the material based on the application of the previously trained machine learning model. In some examples, such as shown in FIG. 3, the previously trained machine learning model can generate an image 304 of the material depicting the probability of a flaw per pixel or voxel based on the application of the previously trained machine learning model. In other examples, the probability can be generated and then applied to another previously trained machine learning model, such as to assist in prediction of a type of flaw.

The probability of the flaw can include, for example a probability of no flaw, a probability of a planar reflector, and/or a probability of an omnidirectional reflector. A planar reflector can detect specular reflections and an omnidirectional reflector can detect diffractions. For example, the backwall of a weld can be seen as a planar reflector.

In some examples, the processor circuit can associate a characteristic with a corresponding probability and then display the generated image ("flaw characterization image") using the associated characteristic. For example, for each pixel or voxel in the image 304, a characteristic, such as a color or amplitude, can be associated with a corresponding probability, and then the processor circuit can cause a video display to display the generated image using the associated characteristic. As an example, the color or amplitude can increase in intensity as the probability increases. In this manner, a user, such as a technician, can quickly determine whether a flaw is present in the material by viewing the image 304.

Figure 4:
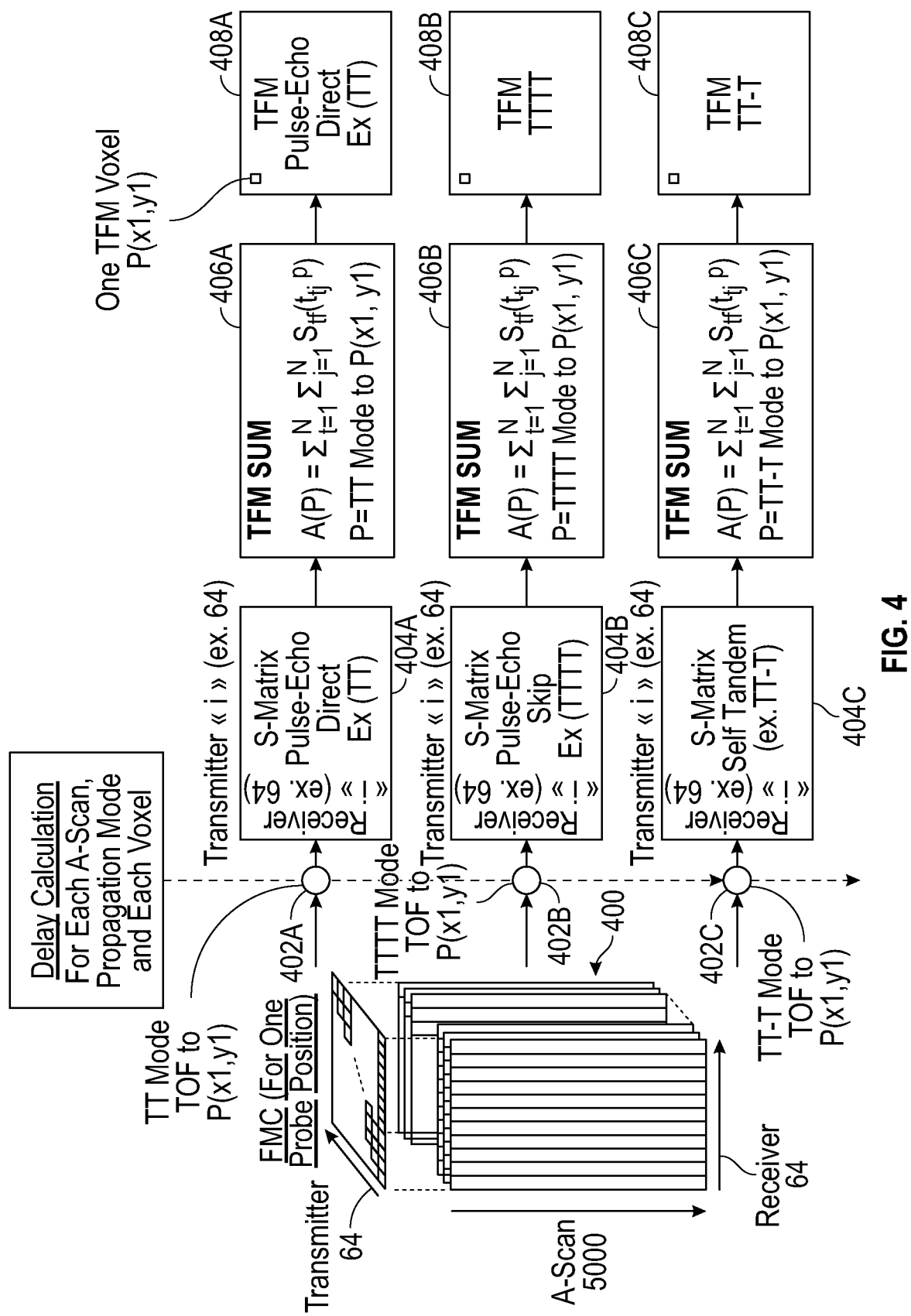
FIG. 4 is a conceptual diagram illustrating a non-limiting example of total focusing method that uses multiple propagation modes.

FIG. 4 is a conceptual diagram illustrating a non-limiting example of total focusing method that uses multiple propagation modes. Starting on the left-hand side, an acoustic inspection system, such as the acoustic inspection system 100 of FIG. 1, can include 64 elements, where all elements transmit and then receive, which generates a matrix of A-scans that constitute the FMC data 400. In this non-limiting example, three propagation modes 402A-402C were used: pulse echo direct (TT), self-tandem (TT-T), and/or pulse echo with skip (TT-TT). Additional or alternative propagation modes can be used. The propagation modes can be selected before executing the methods of this disclosure.

A processor circuit, such as the processor circuit 102 of FIG. 1, can calculate for each propagation mode 402A-402C a delay for each A-scan and for each pixel or voxel. In this non-limiting example, the processor circuit can generate three S-matrix data sets 404A-404C corresponding to the three propagation modes 402A-402C, with each S-matrix data set including amplitude information and the corresponding delay data (or phase data) for each pixel or voxel. The processor circuit can perform a TFM summation 406A-406C on each S-matrix data set to generate a single pixel or voxel in a corresponding image 408A-408C of the material. In other examples, more than three or less than three propagation modes can be used.

By using the techniques shown in FIG. 4, three separate images are created. For a user, such as a technician operating the acoustic inspection system, it can be time consuming to review multiple images in order to discern whether a flaw is present. Analysis is a significant portion of the time required to conduct an inspection and reducing the number of images to review can speed up analysis.

Figure 5:
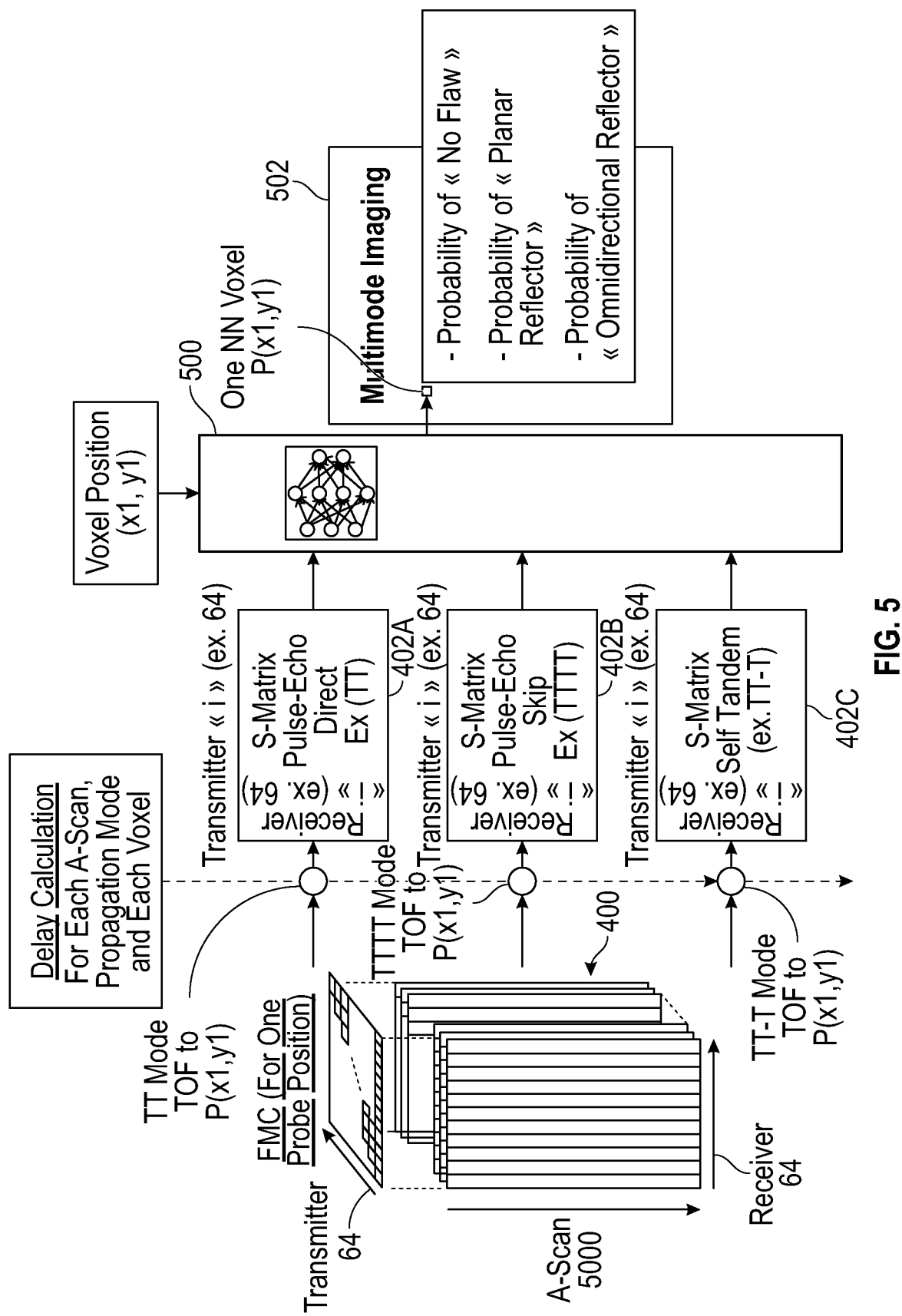
FIG. 5 is a conceptual diagram illustrating another non-limiting example of a computerized method of image processing using processing circuitry to apply a previously trained machine learning model in a system for non-destructive testing (NDT) of a material.

By using various techniques of this disclosure, a previously trained machine learning can be used to generate a combined multi-propagation mode image of the material depicting the probability of the flaw per pixel or voxel, as shown in FIG. 5. Including data from multiple propagation modes provides more information to the machine learning model, which can improve the image generated. In contrast, multiple modes using the techniques of FIG. 4 only produces more images to review, which can be time-consuming to analyze.

FIG. 5 is a conceptual diagram illustrating another non-limiting example of a computerized method of image processing using processing circuitry to apply a previously trained machine learning model in a system for non-destructive testing (NDT) of a material. Starting on the left-hand side, an acoustic inspection system, such as the acoustic inspection system 100 of FIG. 1, can acquire acoustic imaging data of the material, such as FMC, which is acquired at least in part using an acoustic imaging modality, such as TFM. The acoustic inspection system can include 64 elements, where all elements transmit and then receive, which generates a matrix of A-scans that constitute the FMC data 400. In this non-limiting example, three propagation modes were used: pulse echo direct (TT), self-tandem (TT-T), and/or pulse echo with skip (TT-TT).

A processor circuit, such as the processor circuit 102 of FIG. 1, can calculate for each propagation mode 402A-402C a delay for each A-scan and for each pixel or voxel. The processor circuit can generate three acoustic imaging data sets, such as S-matrices 404A-404C, corresponding to the three acoustic propagation modes. For each S-matrix, the processor circuit can include amplitude information and the corresponding delay data (or phase data) for each pixel or voxel. As described in more detail below, in some examples, the S-matrix can include phase data only and no amplitude information.

Instead of performing a TFM summation on each S-matrix data set to generate a single pixel or voxel in an image of the material, as in FIG. 4, the processor circuit 102 or another processor circuit can apply a previously trained machine learning model 500 to each acoustic imaging data set, such as to the S-matrices 402A-402C or other acoustic imaging data set, such as a plane wave matrix or other matrix or data set.

The previously trained machine learning model 500 can generate a probability of a flaw per pixel or voxel in the material based on the application of the previously trained machine learning model. In some examples, such as shown in FIG. 5, the previously trained machine learning model can generate a combined multi-propagation mode image 502 of the material depicting the probability of a flaw per pixel or voxel based on the application of the previously trained machine learning model (a "flaw characterization image"). In other examples, the probability can be generated and then applied to another previously trained machine learning model, such as to assist in prediction of a type of flaw.

The number of voxels generated in an image, such as the combined multi-propagation mode image 502, is arbitrary and is independent of the size of the aperture. In some examples, the resolution can be set relative to the wavelength, such as lambda/5.

Figure 6:
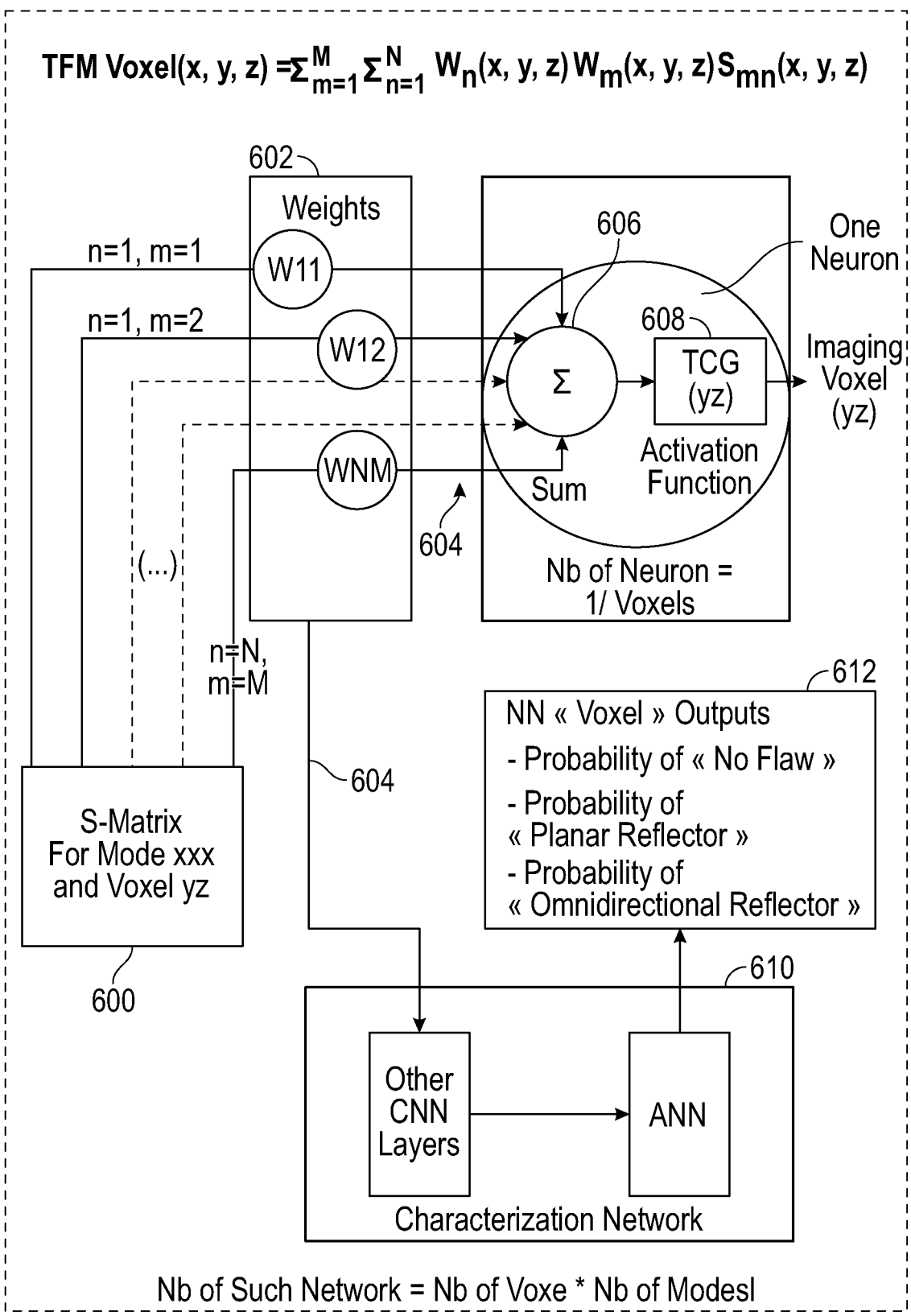
FIG. 6 is a conceptual diagram illustrating the generation of both a conventional TFM image and a flaw characterization image using various techniques of this disclosure.

FIG. 6 is a conceptual diagram illustrating the generation of both a conventional TFM image and a flaw characterization image using various techniques of this disclosure. Rather than produce only a flaw characterization image, as described above, that depicts the probability of a flaw per pixel or voxel based on the application of a previously trained machine learning model, the previously trained machine learning model can also output a conventional TFM image.

An acoustic imaging data set, such as an S-matrix 600, corresponding to an acoustic propagation mode can be weighted by using various weights 602. In a conventional TFM manner, the weighted outputs 604 can be summed by a summing algorithm 606 and then applied to an activation function 608 to produce a time corrected gain (TCG) that can produce an imaging pixel or voxel.

Additionally or alternatively, a previously trained machine learning model 610 can tap off the weighted outputs 604 to generate an image 612 of the material depicting the probability of a flaw per pixel or voxel. In this manner, a flaw characterization image 612 and/or a conventional image, such as a TFM image, can be produced. As an example, it may be desirable to produce a conventional image if a flaw characterization image would require more processing power than available at that moment. As such, in some examples, a conventional TFM can produced during the scanning process and then later, flaw characterization images can be produced when more processing power is available.

In some examples, the techniques of this disclosure can be combined with phase summation techniques. The basic principle of phase summation is to use only the phase of the received acoustic signal, such as an A-Scan, instead using both amplitude and phase as in classical TFM approach. Then, the final imaging is not affected by the amplitude of signals used for this reconstruction and do not need to be compensated by empirical measurements such as TCG (Time Corrected Gain) and Automatic Gain Control (ACG). The amplitude terms can then be factored out of the summation process, leaving the phase related coherence terms to be summed to form the final image.

The phase behavior of the system provides statistics that can be much easier to handle than amplitude-based imaging. Also, the data payload is much smaller. For example, the phase can be encoded in a single bit. In addition, with phase input, the parameters of the machine learning model can be accurately defined almost entirely from theoretical modeling.

The amplitude of a signal can be affected by such factors as angle, position, and the type of material itself. Phase, however, can be independent of many of these factors. By stripping out the amplitude of the signal and only using its phase, the machine learning model can be faster, easier to train, such as with minimal or even no experimental datasets, and more robust.

In some examples, an acoustic imaging system, such as the acoustic imaging system 100 of FIG. 1 can generate a phase-based acoustic imaging data set, such as a phase-based S-matrix corresponding to an acoustic propagation mode. A processor circuit can then apply a previously trained machine learning model to the acoustic imaging data set, and generate an image of the material depicting a probability of a flaw per pixel or voxel based on the application of the previously trained machine learning model.

Additional information regarding a phased-based approach to ultrasonic testing can be found in commonly assigned U.S. Provisional Patent Application No. 62/983, 172, titled "PHASE-BASED APPROACH FOR ULTRASONIC INSPECTION" to Guillaume Painchaud-April et al., filed on Feb. 28, 2020, the entire contents of which being incorporated herein by reference.

Figure 7:
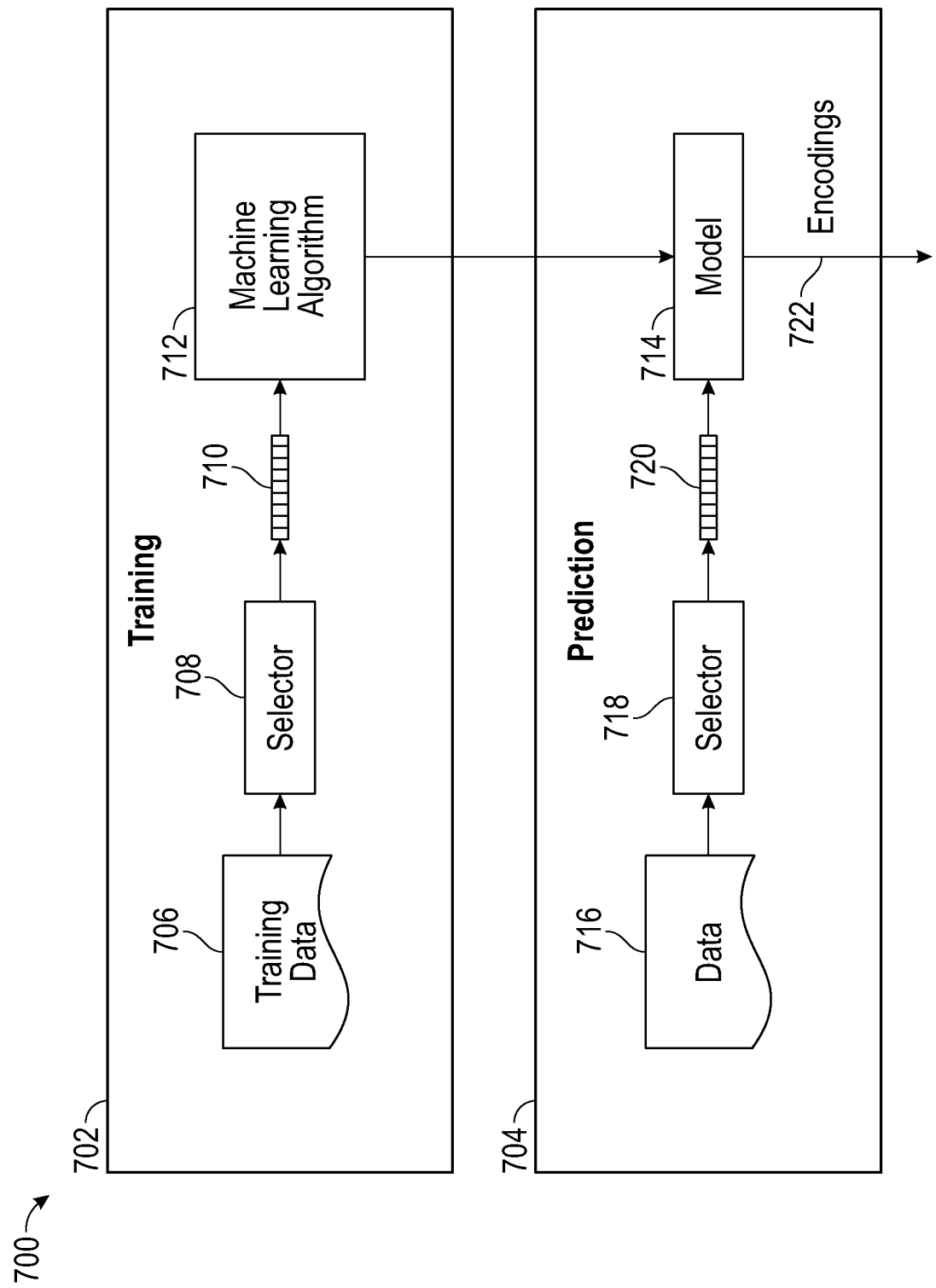
FIG. 7 shows an example machine learning module according to some examples of the present disclosure.

FIG. 7 shows an example machine learning module 700 according to some examples of the present disclosure. The machine learning module 700 can be implemented in whole or in part by one or more computing devices. In some examples, a training module 702 can be implemented by a different device than a prediction module 704. In these examples, the model 714 can be created on a first machine, e.g., a desktop computer, and then sent to a second machine, e.g., a handheld device.

The machine learning module 700 utilizes a training module 702 and a prediction module 704. The training module 702 can implement a computerized method of training processing circuitry, such as the processor 802 of FIG. 8, using machine learning in a system for non-destructive testing (NDT) of a material to generate an image of the material depicting a probability of a flaw per pixel or voxel (or a "flaw characterization image").

The training module 702 inputs training data 706 into a selector module 708 that selects a training vector from the training data. The selector module 708 can include data normalization/standardization and cleaning, such as to remove any useless information. In some examples, the model 714 itself may perform aspects of the selector module, such as a gradient boosted trees.

The training module can train the machine learning module 700 on a plurality of flaw or no flaw conditions. The training data 706 can include, for example, one or more of simulations of a plurality of types of material flaws in the material, simulations of a plurality of positions of material flaws in the material, or simulations of a plurality of ghost echoes in the material to simulate no flaw conditions. The training data can be supplemented by experimental measurement, such as a reading on a calibration block having the material and geometry characteristics corresponding to the planned inspection. In some examples, a model can be pre-trained with simulated flaws and have a few epoch of training on the calibration block.

The training data 706 can be labeled. In other examples, the training data may not be labeled, and the model can be trained using feedback data—such as through a reinforcement learning method.

The selector module 708 selects a training vector 710 from the training data 706. The selected data can fill the training vector 710 and includes a set of the training data that is determined to be predictive of a classification, where the classification includes a probability of a flaw per pixel or voxel based on the application of the previously trained machine learning model. Information chosen for inclusion in the training vector 710 can be all the training data 706 or in some examples, can be a subset of all the training data 706. The training vector 710 can be utilized (along with any applicable labels) by the machine learning algorithm 712 to produce a model 714 (a trained machine learning model). In some examples, other data structures other than vectors can be used. The machine learning algorithm 712 can learn one or more layers of a model.

Example layers can include convolutional layers, dropout layers, pooling/up sampling layers, SoftMax layers, and the like. Example models can be a neural network, where each layer is comprised of a plurality of neurons that take a plurality of inputs, weight the inputs, input the weighted inputs into an activation function to produce an output which can then be sent to another layer. Example activation functions can include a Rectified Linear Unit (ReLu), and the like. Layers of the model can be fully or partially connected.

In the prediction module 704, data 716 can be input to the selector module 718. The data 716 can include an acoustic imaging data set, such as an S-matrix. The selector module 718 can operate the same, or differently than the selector module 708 of the training module 702. In some examples, the selector modules 708 and 718 are the same modules or different instances of the same module. The selector module 718 produces a vector 720, which is input into the model 714 to generate an image of the material under evaluation depicting a probability of a flaw per pixel or voxel, resulting in an image 722.

For example, the weightings and/or network structure learned by the training module 702 can be executed on the vector 720 by applying vector 720 to a first layer of the model 714 to produce inputs to a second layer of the model 714, and so on until the classification is output, where the classification includes a probability of a flaw per pixel or voxel based on the application of the previously trained machine learning model. As previously noted, other data structures can be used other than a vector (e.g., a matrix).

In some examples, there can be hidden layers between the input and output. In some examples, a convolutional neural network (CNN) can be connected to the s-matrix and the s-matrix can be kept in matrix form (not vector).

The training module can train the machine learning module 700 on a plurality of flaw or no flaw conditions, such as described above. The training module 702 can operate in an offline manner to train the model 714. The prediction module 704, however, can be designed to operate in an online manner. It should be noted that the model 714 can be periodically updated via additional training and/or user feedback. For example, additional training data 706 can be collected as users provide feedback on the classification, where the classification includes a probability of a flaw per pixel or voxel based on the application of the previously trained machine learning model. The feedback, along with the data 716 corresponding to that feedback, can be used to refine the model by the training module 702.

The machine learning algorithm 700 can be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method.

In this manner, the machine learning module 700 of FIG. 7 can assist in implementing a computerized method of image processing using processing circuitry to apply a previously trained machine learning model in a system for non-destructive testing (NDT) of a material, in accordance with this disclosure.

The techniques shown and described in this document can be performed using a portion or an entirety of an inspection system 100 as shown in FIG. 1 or otherwise using a machine 800 as discussed below in relation to FIG. 8.

Figure 8:
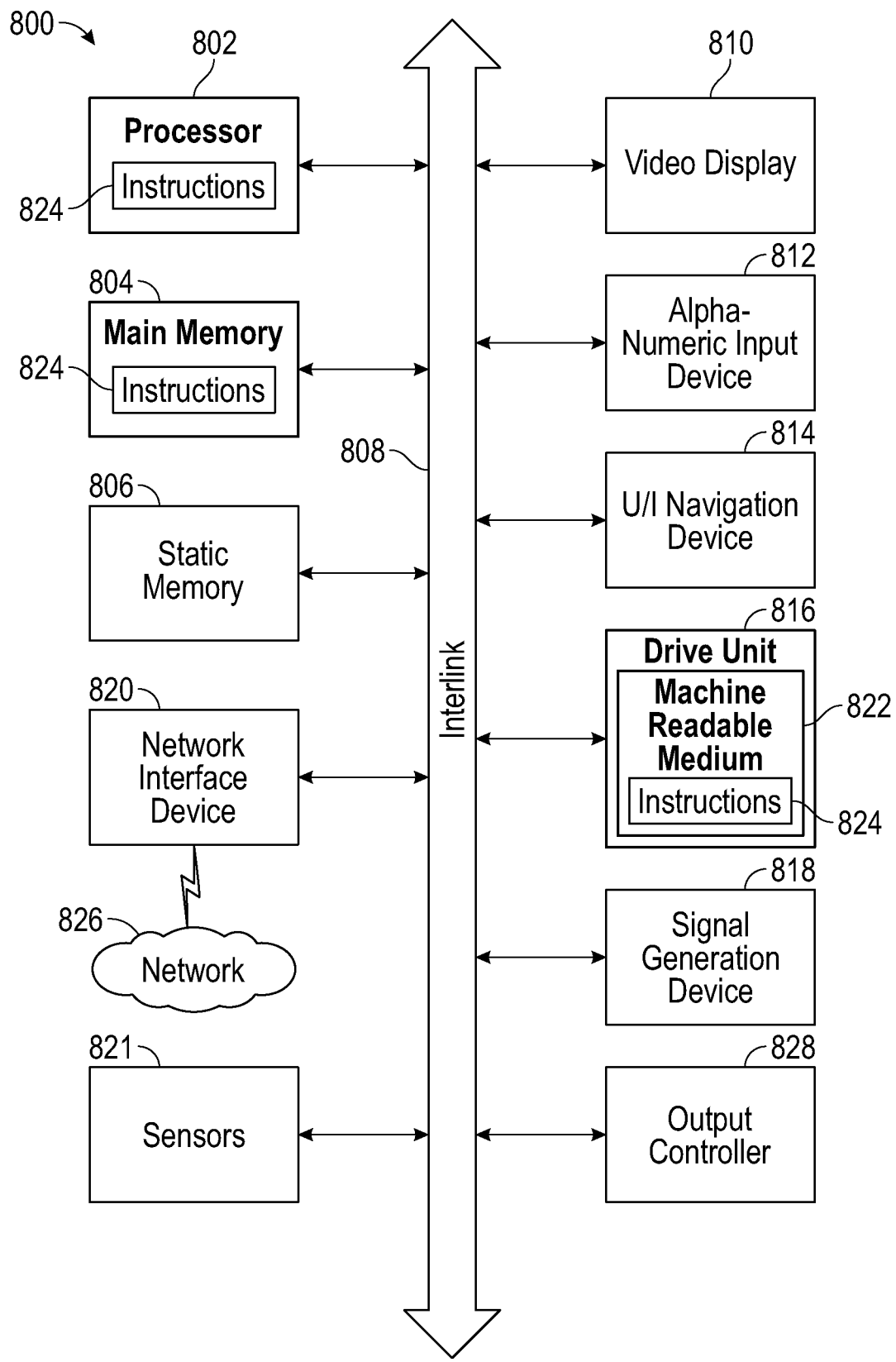
FIG. 8 illustrates a block diagram of an example machine upon which any one or more of the techniques (e.g., methodologies) discussed herein can perform.

FIG. 8 illustrates a block diagram of an example of a machine upon which any one or more of the techniques (e.g., methodologies) discussed herein can perform. In alternative embodiments, the machine 800 can operate as a standalone device or are connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 is a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 can perform one or more of the processes described above. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms (all referred to hereinafter as "modules"). Modules are tangible entities (e.g., hardware) capable of performing specified operations and is configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software can reside on a non-transitory computer readable storage medium or other machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Machine (e.g., computer system) 800 can include a hardware processor 802 (e.g., a central processing unit (CPU), a graphics processing unit (GPU), a hardware processor core, or any combination thereof), a main memory 804, and a static memory 806, some or all of which can communicate with each other via an interlink 808 (e.g., bus). The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 are a touch screen display. The machine 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 can include a machine readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 can constitute machine readable media.

While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media can include non-transitory machine readable media. In some examples, machine readable media can include machine readable media that is not a transitory propagating signal.

The instructions 824 can further be transmitted or received over a communications network 826 using a transmission medium via the network interface device 820. The machine 800 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. In some examples, the network interface device 820 can wirelessly communicate using Multiple User MIMO techniques.

Examples, as described herein, can include, or can operate on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client, or server computer system) or one or more hardware processors are configured by firmware or software (e.g., instructions, an application portion, or an application) as a module that operates to perform specified operations. In an example, the software can reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor is configured as respective different modules at different times. Software can accordingly configure a hardware processor, for example, to constitute a particular module at one instance of time and to constitute a different module at a different instance of time.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

Various Notes

Each of the non-limiting aspects or examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A computerized method of image processing using processing circuitry to apply a previously trained machine learning model in a system for non-destructive testing (NDT) of a material, the method comprising:
    acquiring acoustic imaging data of the material, the acoustic imaging data acquired at least in part using an acoustic imaging modality;
    generating an acoustic imaging data set corresponding to an acoustic propagation mode;
    applying the previously trained machine learning model to the acoustic imaging data set; and
    generating an image of the material depicting a probability of a flaw per pixel or voxel based on the application of the previously trained machine learning model.

2. The method of claim 1, wherein the acoustic imaging modality includes an acoustic phased array system.

3. The method of claim 1, wherein the acoustic imaging data set includes a scattering matrix (S-matrix).

4. The method of claim 1, wherein the probability of the flaw is selected from a group consisting of a probability of no flaw, a probability of a planar reflector, and a probability of an omnidirectional reflector.

5. The method of claim 1, comprising:
    associating a characteristic with a corresponding probability; and
    displaying the generated image using the associated characteristic.

6. The method of claim 1, wherein the acoustic imaging data set includes phase data of received acoustic echo signals and does not contain amplitude data of the received acoustic echo signals.

7. The method of claim 1, wherein the image is a first image, the method comprising:
    generating a second image of the material, wherein the second image does not depict a probability of a flaw per pixel or voxel.

8. The method of claim 1, wherein generating the acoustic imaging data set corresponding to the acoustic propagation mode includes:
    generating at least two acoustic imaging data sets, each acoustic imaging data set corresponding to a different acoustic propagation mode; and
    applying the previously trained machine learning model to at least one of the acoustic imaging data sets.

9. The method of claim 8, wherein generating the image of the material depicting the probability of the flaw per pixel or voxel based on the application of the previously trained machine learning model includes:
    generating a combined multi-propagation mode image of the material depicting the probability of the flaw per pixel or voxel based on the application of the previously trained machine learning model.

10. The method of claim 1, wherein the acoustic imaging data is full matrix capture (FMC) data.

11. The method of claim 1, wherein the acoustic imaging modality is an acoustic phased array system.

12. A computerized method of training processing circuitry using machine learning in a system for non-destructive testing (NDT) of a material, the method comprising:
    training a machine learning model to be used to generate an image of the material from an acoustic imaging data set corresponding to an acoustic propagation mode, the acoustic imaging data set acquired at least in part using an acoustic imaging modality.

13. The method of claim 12, wherein training the machine learning model comprises:
    simulating a plurality of types of material flaws in the material;
    applying the simulations to a training module; and
    generating the machine learning model based on the applied simulations.

14. The method of claim 12, wherein training the machine learning model comprises:
    simulating a plurality of positions of material flaws in the material;
    applying the simulations to a training module; and
    generating the machine learning model based on the applied simulations.

15. The method of claim 12, wherein training the machine learning model comprises:
- simulating a plurality of ghost echoes in the material to simulate no flaw conditions;
- applying the simulations to a training module; and
- generating the machine learning model based on the applied simulations.

16. A computerized method of image processing using processing circuitry to apply a previously trained machine learning model in a system for non-destructive testing (NDT) of a material, the method comprising:
- acquiring acoustic imaging data of the material, the acoustic imaging data acquired at least in part using an acoustic imaging modality;
- generating an acoustic imaging data set corresponding to an acoustic propagation mode;
- applying the previously trained machine learning model to the acoustic imaging data set; and
- generating a probability of a flaw per pixel or voxel based on the application of the previously trained machine learning model.

\* \* \* \* \*